(12) United States Patent
Dickerson

(10) Patent No.: US 12,392,393 B2
(45) Date of Patent: Aug. 19, 2025

(54) BALANCE WEIGHT FOR VEHICLE WHEEL

(71) Applicant: Tyler Dickerson, Scottsdale, AZ (US)

(72) Inventor: Tyler Dickerson, Scottsdale, AZ (US)

( * ) Notice: Subject to any disclaimer, the term of this patent is extended or adjusted under 35 U.S.C. 154(b) by 497 days.

(21) Appl. No.: 17/950,378

(22) Filed: Sep. 22, 2022

(65) Prior Publication Data

US 2023/0089103 A1 Mar. 23, 2023

Related U.S. Application Data

(60) Provisional application No. 63/247,426, filed on Sep. 23, 2021.

(51) Int. Cl.
*F16F 15/32* (2006.01)

(52) U.S. Cl.
CPC .......... *F16F 15/328* (2013.01); *F16F 15/324* (2013.01)

(58) Field of Classification Search
CPC ........ F16F 15/32; F16F 15/324; F16F 15/328; F16F 15/345
See application file for complete search history.

(56) References Cited

U.S. PATENT DOCUMENTS

| | | | |
|---|---|---|---|
| 3,960,409 A * | 6/1976 | Songer | F16F 15/328 |
| | | | 301/5.21 |
| 4,728,154 A | 3/1988 | Boyle et al. | |
| 6,592,188 B2 * | 7/2003 | Yamaguchi | F16F 15/328 |
| | | | 301/5.21 |
| 6,890,038 B1 | 5/2005 | Lucchesi | |
| 6,979,060 B2 | 12/2005 | Fogal, Sr. et al. | |
| 7,044,561 B2 * | 5/2006 | Petchel | F16F 15/328 |
| | | | 301/5.21 |
| 7,753,453 B2 | 7/2010 | Baek | |
| 8,449,042 B2 | 5/2013 | Yamaguchi et al. | |
| 9,278,578 B2 | 3/2016 | Baek | |
| 10,233,314 B2 | 3/2019 | Kim | |
| 10,428,900 B2 * | 10/2019 | Belknap | F16F 15/324 |
| 2007/0108834 A1 | 5/2007 | Fogal et al. | |
| 2009/0243370 A1 * | 10/2009 | Peniche | F16F 15/328 |
| | | | 301/5.21 |
| 2013/0038116 A1 | 2/2013 | Fischer | |
| 2015/0266339 A1 | 9/2015 | Bode | |

\* cited by examiner

*Primary Examiner* — Jason R Bellinger
(74) *Attorney, Agent, or Firm* — Whitley Legal Group, PC; AnnMarie W Whitley

(57) ABSTRACT

An improved adhesive-type weight system for use with vehicle wheels includes one weight or a series of weights arranged as a tape. Each weight is formed of a flexible thin iron plate material having a perimeter with opposing longitudinal ends and opposing lateral sides. The series of weights can be oriented end-to-end or side-to-side, and each weight includes two planar sections separated by a center raised section. The center section can be a peak, an arch, a step, or some other raised configuration. Additionally, it can be tapered from one side to another. On the underside of each weight is adhesive and a release paper, which can be continuous across a series of weights or separated and applied under each individual weight. Where weights are attached to adjacent weights in series, preferably a notch or cut extends along the connection to encourage easy separation.

14 Claims, 3 Drawing Sheets

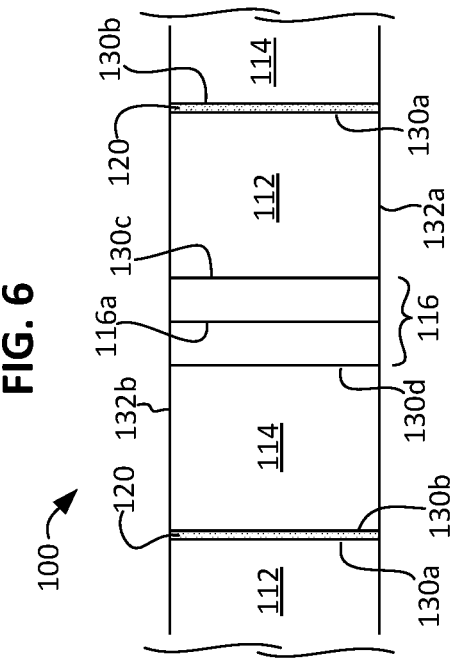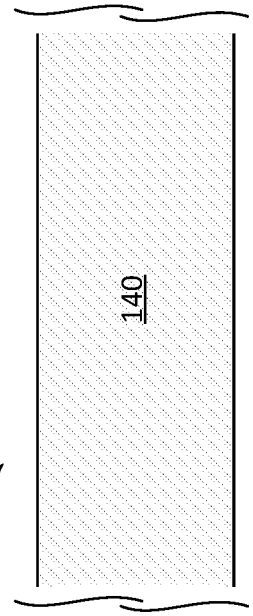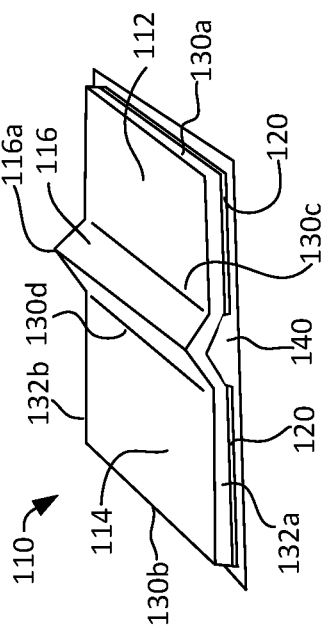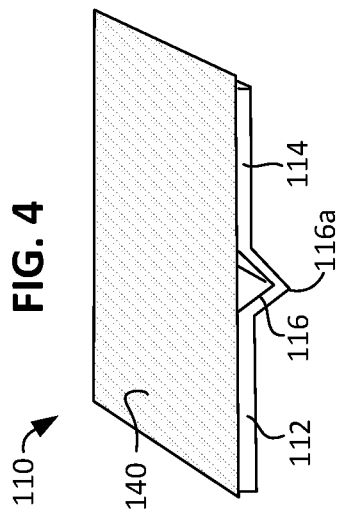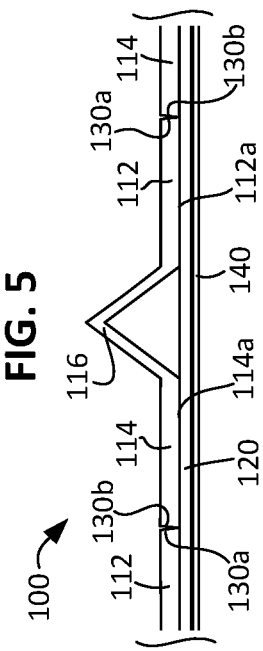

BALANCE WEIGHT FOR VEHICLE WHEEL

CROSS-REFERENCE TO RELATED APPLICATIONS

This application claims the benefit of provisional U.S. Application 63/247,426 filed Sep. 23, 2021.

FIELD OF INVENTION

This invention relates to balance weights for wheels. More particularly, this invention relates to an improved adhesive-type weight system for automobile wheels with features that improve application and removal of the weight from the wheel.

BACKGROUND

Due in part to the way tires are manufactured, it is common for them to have an irregular distribution of weight. When installed on a vehicle, such weight imbalance causes tires to wear unevenly and chassis vibrations as the tires rotate, which in turn decreases the comfort for the vehicle passengers. If the vibration is too excessive or continuously generated for an extended period, the chassis also can become fatigued. As a result, cracks and gaps can occur between or from various parts, which reduces their lifespan, impacts steering stability, and increases the risk of accidents.

To address tire weight imbalance, balance weights can be installed at strategic points along a vehicle's wheel where unequal distribution of tire weight is canceled out to uniformly maintain distribution of tire weight. Weights typically are fixed to the rim of a wheel with a deformable clip or a self-adhesive. Because weights secured with clips cannot be applied to all vehicle wheels or require the use of special tools for installation, adhesive-type weights are increasingly popular.

Adhesive-type weights typically comprise a weight body formed from a flexible iron plate material having a rectangular band structure. Adhesive is bonded to one side of the iron material, and a release paper covers the adhesive. The release paper protects the adhesive and is removed when the weight is to be bonded to a wheel. Several individual weights can be strung together along a strip of adhesive and release paper, or a singular extended weight can have several breaking points formed thereon. With both configurations, the adhesive-type weight can be customized by removing only the required amount of weight from the release paper and separating it from the remaining iron material. Because of how they are formed, adhesive-type weights can come in substantial lengths and are commonly referred to as tape weights.

While adhesive-type weights are customizable and easy to apply to a vehicle once the vehicle's surface has been cleaned, they are difficult to remove when new weights need to be installed. Unfortunately, over time a tire can become imbalanced again or replaced, necessitating new adjustments. It would be desirable to provide an adhesive-type weight that is both easy to apply and easy to remove without compromising its ability to remain firmly affixed to the wheel for as long as it is needed. Moreover, it would be desirable to provide such an adhesive-type weight in a tape form that allows for customization.

SUMMARY OF THE INVENTION

An improved adhesive-type weight system for use with vehicle wheels includes one or more weights arranged in series where each weight is formed of a flexible thin iron plate material having a substantially rectangular perimeter with opposing longitudinal ends and opposing lateral sides. Each weight is connected to or adjacent to additional weights along its ends, and each weight includes two planar sections separated by a center raised section. The center section can be a peak, an arch, a step, or some other raised configuration. Additionally, it can be tapered from one side to another. On the underside of each weight is adhesive and a release paper, which can be continuous across a series of weights or separated and applied under each individual weight. Where weights are attached to adjacent weights at their ends, preferably a notch or cut extends along the adjacent ends to encourage easy separation.

To apply the weights, the desired number of weights is obtained, and the release paper removed. Then, the weights can be pressed on and bonded to a vehicle's wheel. Using the end of a flat-head screwdriver or a similar tool while tapping its handle with a mallet, force can be applied to the center section of one or more of the weights, which allows them to be quickly and easily removed.

BRIEF DESCRIPTION OF THE DRAWINGS

FIG. 3 is a top perspective view of a preferred embodiment of an individual weight according to the present invention.

FIG. 4 is a bottom perspective view of the preferred embodiment of an individual weight the present invention.

FIG. 5 is a side view of the preferred embodiment of the adhesive-type weight of the present invention.

FIG. 6 is a top view of a series of weights according to an alternate embodiment of the adhesive-type weight system of the present invention.

FIG. 7 is a bottom view of the embodiment of the adhesive-type weight system of the present invention shown in FIG. 6.

DETAILED DESCRIPTION OF THE INVENTION

Figure 1:
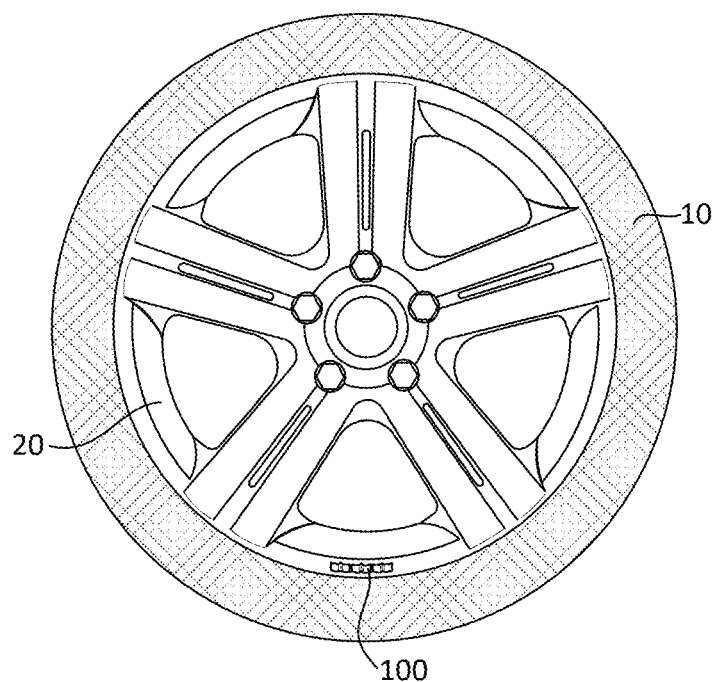
FIG. 1 is a side view of the adhesive-type weight system according to the present invention as applied to a tire and wheel.
Figure 2:
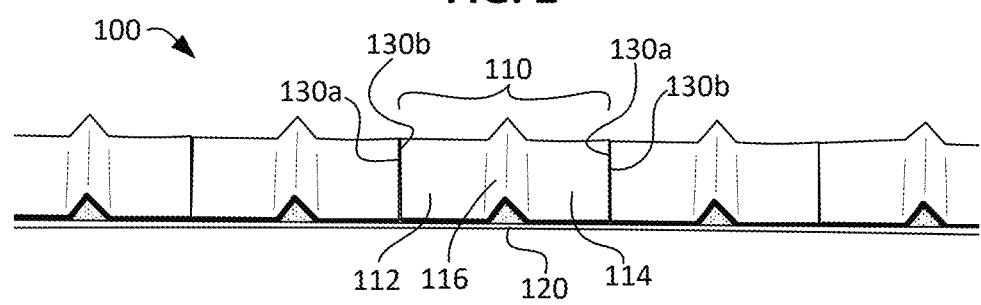
FIG. 2 is a top view of the adhesive-type weight system where weights area arranged in series according to the present invention.
Figure 8:
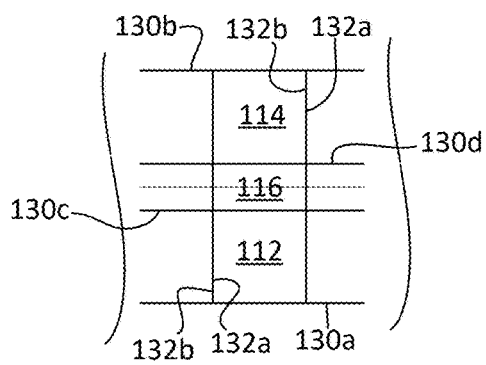
FIG. 8 is a top view of a series of weights according to a second alternate embodiment of the adhesive-type weight system of the present invention.

An improved adhesive-type weight system 100 for use with wheels 20 and tires 10 includes one or more weights 110 arranged in series as shown as shown in FIGS. 1-2. Each weight 110 is formed of a flexible thin iron plate material preferably having a substantially rectangular perimeter with opposing first and second longitudinal ends 130*a*, 130*b* and first and second opposing lateral sides 132*a*, 132*b*. Preferably, first longitudinal end 130*a* is substantially parallel to second longitudinal end 130*b*, and first lateral side 132*a* is substantially parallel to second lateral side 132*b*. Alternatively, each weight may have a perimeter that is non-rectangular such that one or both of longitudinal ends 130a, 130b are not parallel to one another and lateral sides 132a, 132b are not parallel to one another. Although iron is preferred, weight 110 can be formed of a flexible lead, zinc, zinc, or metal alloy, all of which falls within the scope of this invention. Preferably, weight 110 is connected to additional weights 110 along its ends 130a and 130b or arranged in a series with additional weights 110 sitting adjacent to one another along its ends 130a and 130b. Alternatively, weight 110 may be a singular weight 110 for application to wheel 20 as shown in FIGS. 3 and 4, or the series of weights 110 may be arranged along their sides 132a and 132b as shown in FIG. 8. Preferably, each weight 110 is about 0.25 ounces but smaller or larger weights can also be configured according to the present invention.

Figure 9:
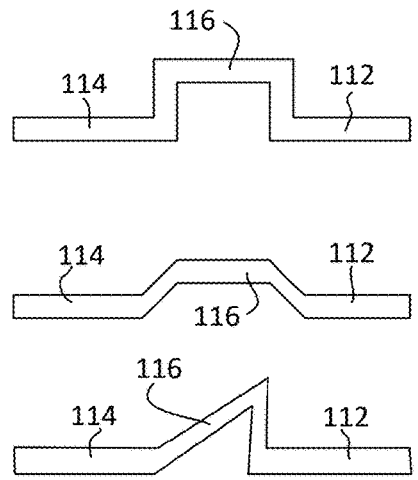
FIG. 9 is an illustration of alternate configurations for the center section of each individual weight.
Figure 10:
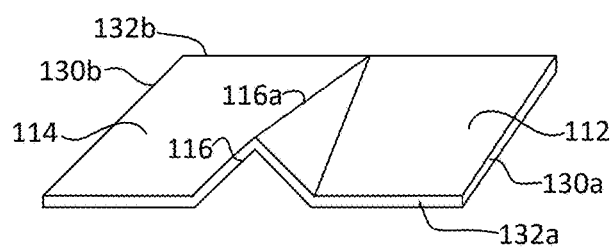
FIG. 10 is an illustration of a tapered configuration for the center section of each individual weight.

Each weight 110 includes a first planar section 112, a second planar section 114, and a raised center section 116 disposed between the first planar section 112 and second planar section 114, as shown in the Figures. The proximal end of first planar section 112 is the first longitudinal end 130a of the overall weight 110, and the distal end 130c of first planar section connects to center section 116. The proximal end of second planar section 114 is the second longitudinal end 130b of the overall weight 110, and the distal end 130d of second planar section connects to center section 116. Preferably section 112 is integrally connected to center section 116 along the distal end 130c of first planar section 112. Likewise, preferably section 114 is integrally connected to center section 116 along the distal end 130d of the second planar section. Also preferably, center section 116 forms a peak 116a as shown in FIGS. 1-8 and 10. Alternatively, center section 116 can be an arch, a step, or another configuration as long as it creates an open space below it relative to first and second planar sections 112 and 114. FIG. 9 illustrates some examples of alternate configurations for center section 116 of each weight 110. The peak, arch, step, or other raised configuration of center section 116 preferably uniformly extends from first lateral side 132a to second lateral side 132b. Alternatively, the peak, arch, step, or other raised configuration of center section 116 can taper from one height to another across weight 110 as shown in FIG. 10.

Figure 11:
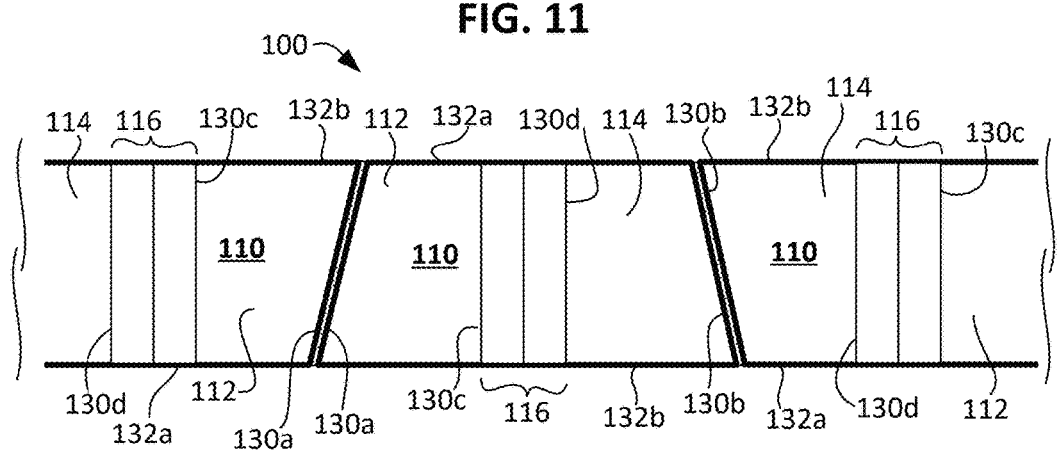
FIG. 11 is a top vies of a series of weight according to a third alternate embodiment of the adhesive-type weight system of the present invention.

For each weight 110, one or more adhesive units 120 connects or preferably covers at least the lower surfaces 112a and 114a of planar sections 112 and 114. Adhesive units 120 allow each individual weight 110 to attach to a wheel of a vehicle. More preferably, when weights 110 are not attached to the wheel of a vehicle, release paper 140 covers the adhesive units 120 to protect the adhesive units 120. Release paper 140 is removed immediately prior to bonding the weight 110 or series of weights 110 to the wheel. Adhesive units 120 can be a series of separate adhesive units 120 that are individually bonded to the underside or lower surfaces 112a, 114a of each planar section 112 and 114 of weight 110 as shown in FIG. 3 or a continuous sheet of adhesive that supports a series of weights 110 as shown in FIG. 5. Preferably, no adhesive unit 120 directly contacts the underside of center section 116 where it is raised as is shown in the Figures. Alternatively, it can be applied to the underside or lower surfaces of the entire weight 110 including to the lower surface (not labeled) of center section 116. Release paper 140 can be a series of individual release papers applied to individual weights 110 or a continuous release paper 140 applied to a series of weights 110.

Where weights 110 are arranged in a series, they may be separate and distinct weight that abut or are adjacent to other weights or they may be at least partially attached or connected where they abut one another. If partially attached, preferably a score, notch, or cut extends along the union to define the connection point and allow a user to easily disconnect one weight 110 from another. FIG. 6 illustrates a configuration of weights 110 in series, arranged in an end-to-end manner, where the weights sit adjacent to each without being attached. FIG. 5 illustrates a configuration of weights 110 in series, arranged in an end-to-end manner, where the weights are connected with a notch or partial cut extends along and defines adjacent ends 130a, 130b. As shown, when weights are arranged end-to-end, the first longitudinal end 130a of one weight preferably abuts the second longitudinal end 130b of an adjacent weight, especially when the individual weights 110 have a substantially rectangular perimeter. Should the weights have a non-rectangular perimeter, they may be arranged differently. For example, a series of weights with a triangular or isosceles trapezoidal perimeter may be arranged so that the first longitudinal end 130a of a first weight abuts the first longitudinal end of a second weight, the second longitudinal end of a second weight abuts the second longitudinal end of a third weight, and the first longitudinal end of the third weight abuts the first longitudinal end of a fourth weight. FIG. 11 illustrates such an arrangement.

To use weights 110, a technician removes the release paper and then applies as many weights 110 as needed to balance the tire. When weights 110 must be removed, a technician places the end of a tool, such as the end of a flat-head screwdriver, under the center section 116 of one of weights 110. Using a rubber mallet, the technician can tap on handle of the screwdriver to apply force under the center section 110. This overcomes the strong adhesive bond between weight 110 and wheel 20 and encourages the weight 110 to lift off the wheel surface. The technician can quickly and simply move the screwdriver and mallet to the next center section 116 and continue releasing individual weights. Because each weight 110 has a raised center section 116, they can be quickly and easily removed, which improves a technician's efficiency.

While there has been illustrated and described what is at present considered to be the preferred embodiment of the present invention, it will be understood by those skilled in the art that various changes and modifications may be made and equivalents may be substituted for elements thereof without departing from the true scope of the invention disclosed, but that the invention will include all embodiments falling within the scope of the claims.

I claim:

1. A balance weight for a vehicle wheel comprising:
   a) a first longitudinal end;
   b) a second longitudinal end opposite the first end;
   c) a first lateral side extending from the first longitudinal end to the second longitudinal end;
   d) a second lateral side extending from the first longitudinal end to the second longitudinal end; and
   e) a flexible body disposed between the first longitudinal end and second longitudinal end, the flexible body comprising:
      i) a first planar section comprising a proximal end and a distal end, wherein the first longitudinal end of the weight comprises the distal end of the first planar section;
      ii) a second planar section comprising a proximal end and a distal end, wherein the second longitudinal end of the weight comprises the distal end of the second planar section;

iii) a non-planar center section disposed between the proximal end of the first planar section and the proximal end of the second planar section, wherein the center section further comprises a peak extending from the first lateral side of the balance weight to the second lateral side of the balance weight, the first planar section is integrally connected to the center section at the proximal end of the first planar section, and the second planar section is integrally connected to the center section at the proximal end of the second planar section; and iv) an adhesive unit disposed along a lower surface of the first planar section and a lower surface of the second planar section.

2. The balance weight of claim 1 further comprising a release paper removably attached to the adhesive unit.

3. The balance weight of claim 1 wherein the peak is uniform and disposed substantially parallel to the first longitudinal end of the balance weight and to the second longitudinal end of the balance weight.

4. The balance weight of claim 3 wherein the peak is equidistant from the first longitudinal end of the balance weight and the second longitudinal end of the balance weight.

5. The balance weight of claim 1 wherein the height of the peak tapers from the first lateral side of the balance weight to the second lateral side of the balance weight.

6. A balance weight for a vehicle wheel comprising:
a) a first longitudinal end;
b) a second longitudinal end opposite the first end;
c) a first lateral side extending from the first longitudinal end to the second longitudinal end;
d) a second lateral side extending from the first longitudinal end to the second longitudinal end; and
e) a flexible body disposed between the first longitudinal end and second longitudinal end, the flexible body comprising:
  i) a first planar section comprising a proximal end and a distal end, wherein the first longitudinal end of the weight comprises the distal end of the first planar section;
  ii) a second planar section comprising a proximal end and a distal end, wherein the second longitudinal end of the weight comprises the distal end of the second planar section;
  iii) a non-planar center section disposed between the proximal end of the first planar section and the proximal end of the second planar section, wherein the center section further comprises a step extending from the first lateral side of the balance weight to the second lateral side of the balance weight, the first planar section is integrally connected to the center section at the proximal end of the first planar section, and the second planar section is integrally connected to the center section at the proximal end of the second planar section; and
  iv) an adhesive unit disposed along a lower surface of the first planar section and a lower surface of the second planar section.

7. A balance weight for a vehicle wheel comprising:
a) a first longitudinal end;
b) a second longitudinal end opposite the first end;
c) a first lateral side extending from the first longitudinal end to the second longitudinal end;
d) a second lateral side extending from the first longitudinal end to the second longitudinal end; and
e) a flexible body disposed between the first longitudinal end and second longitudinal end, the flexible body comprising:
  i) a first planar section comprising a proximal end and a distal end, wherein the first longitudinal end of the weight comprises the distal end of the first planar section;
  ii) a second planar section comprising a proximal end and a distal end, wherein the second longitudinal end of the weight comprises the distal end of the second planar section;
  iii) a non-planar center section disposed between the proximal end of the first planar section and the proximal end of the second planar section, wherein the center section further comprises an arch extending from the first lateral side of the balance weight to the second lateral side of the balance weight, the first planar section is integrally connected to the center section at the proximal end of the first planar section, and the second planar section is integrally connected to the center section at the proximal end of the second planar section; and
  iv) an adhesive unit disposed along a lower surface of the first planar section and a lower surface of the second planar section.

8. A balance weight tape system for use with a vehicle wheel, the tape comprising a plurality of balance weights arranged in sequence, wherein each balance weight comprises:
a) a first longitudinal end;
b) a second longitudinal end opposite the first longitudinal end; and
c) a flexible body disposed between the first longitudinal end and second longitudinal end, the flexible body comprising:
  i) a first planar section comprising a proximal end and a distal end, wherein the first longitudinal end of the weight comprises the distal end of the first planar section;
  ii) a second planar section comprising a proximal end and a distal end, wherein the second longitudinal end of the weight comprises the distal end of the second planar section;
  iii) a non-planar center section disposed between the proximal end of the first planar section and the proximal end of the second planar section, wherein, for each balance weight, the first planar section of is integrally connected to the center section of the balance weight at the proximal end of the first planar section and the second planar section is integrally connected to the center section at the proximal end of the second planar section; and
  iv) an adhesive unit disposed along a lower surface of the first planar section and a lower surface of the second planar section,
wherein the balance weights are arranged in series such that a first longitudinal end of one balance weight abuts the second longitudinal end of an adjacent balance weight.

9. The tape system of claim 8 further comprising a release paper removably attached to the adhesive units of the balance weights arranged in series.

10. The tape system of claim 8 wherein, for each balance weight, the center section comprises a peak.

11. The tape system of claim 8 wherein, for each balance weight, the center section comprises a step.

12. The tape system of claim 8 wherein, for each balance weight, the center section comprises an arch.

13. The tape system of claim 8 wherein the balance weights are arranged in series such that a first longitudinal end of one balance weight is removably connected to the second longitudinal end of an adjacent balance weight.

14. A balance weight tape system for use with a vehicle wheel, the tape comprising a plurality of balance weights arranged in sequence, wherein each balance weight comprises:

a) a first longitudinal end;

b) a second longitudinal end opposite the first longitudinal end;

c) a first lateral side extending from the first longitudinal end to the second longitudinal end;

d) a second lateral side opposite the first lateral side and extending from the first longitudinal end to the second longitudinal end; and e) a flexible body disposed between the first longitudinal end and the second longitudinal end, the flexible body comprising:

i) a first planar section comprising a proximal end and a distal end, wherein the first longitudinal end of the balance weight comprises the distal end of the first planar section;

ii) a second planar section comprising a proximal end and a distal end, wherein the second longitudinal end of the weight comprises the distal end of the second planar section;

iii) a non-planar center section disposed between the proximal end of the first planar section and the proximal end of the second planar section, wherein the first planar section is integrally connected to the center section of the balance weight at the proximal end of the first planar section and the second planar section is integrally connected to the center section at the proximal end of the second planar section; and iv) an adhesive unit disposed along a lower surface of the first planar section and a lower surface of the second planar section;

wherein the balance weights are arranged in series such that a first lateral side of one balance weight is removably connected to the second lateral side of an adjacent balance weight.

\* \* \* \* \*